(12) United States Patent
Jacob

(10) Patent No.: US 7,319,121 B2
(45) Date of Patent: Jan. 15, 2008

(54) MICROCELLULAR FOAMS OF THERMOPLASTIC VULCANIZATES

(75) Inventor: Sunny Jacob, Akron, OH (US)

(73) Assignee: Advanced Elestomer Systems, Inc., Akron, OH (US)

( * ) Notice: Subject to any disclaimer, the term of this patent is extended or adjusted under 35 U.S.C. 154(b) by 301 days.

(21) Appl. No.: 11/246,772

(22) Filed: Oct. 7, 2005

(65) Prior Publication Data
US 2007/0083007 A1   Apr. 12, 2007

(51) Int. Cl.
*C08L 53/02*   (2006.01)
(52) U.S. Cl. ............................. 525/93; 525/97; 525/98; 525/99
(58) Field of Classification Search ................. 525/93, 525/97, 98, 99
See application file for complete search history.

(56) References Cited

U.S. PATENT DOCUMENTS

| | | | |
|---|---|---|---|
| 3,037,954 | A | 6/1962 | Gessler et al. |
| 4,130,535 | A | 12/1978 | Coran et al. |
| 6,231,942 | B1 | 5/2001 | Blizard et al. |
| 6,303,666 | B1 | 10/2001 | Yorita et al. |
| 6,613,811 | B1 | 9/2003 | Pallaver et al. |
| 6,713,520 | B2 | 3/2004 | Sahnoune et al. |
| 2002/0072561 | A1* | 6/2002 | Johoji et al. ................ 524/505 |
| 2004/0115418 | A1 | 6/2004 | Anderson et al. |
| 2005/0038186 | A1 | 2/2005 | Morikawa et al. |

FOREIGN PATENT DOCUMENTS

| | | |
|---|---|---|
| EP | 0 733 676 | 9/1996 |
| EP | 1 375 576 | 1/2004 |
| WO | WO 2004/016678 | 2/2004 |
| WO | WO 2004/016679 | 2/2004 |
| WO | WO 2005/118652 | 12/2005 |

* cited by examiner

*Primary Examiner*—Jeffrey Mullis

(57) ABSTRACT

The invention described relates to formed profiles comprising microcellular TPE foam compositions, and articles therefrom, wherein the TPE are thermoplastic vulcanizates. The foamed thermoplastic elastomer profile comprises a foamable thermoplastic elastomer composition having a) a cross-linkable hydrocarbon rubber in the presence of b) a thermoplastic polyolefin resin having a Tm greater than 120° C. wherein said composition further comprising: a) 25 to 30 wt % of a partially or fully vulcanized reaction product of said cross-linkable hydrocarbon rubber with a cross-linking agent, said reaction product being present as a dispersed phase; b) 7 to 12 wt % of said thermoplastic resin as a continuous phase; c) 8-22 wt % of an elastomeric thermoplastic modifier comprising 1) 3-7 wt. % copolymers of propylene with one or more of ethylene and $C_4$-$C_{10}$ alpha-olefins, said copolymers having a Tm greater than 20° C. and less than 120° C., and, 2) 5-15 wt. % hydrogenated, triblock styrenic copolymers from styrene and isoprene; and, optionally, d) 3-12 wt. % solid filler; and/or e) 35-45 wt. % of non-aromatic hydrocarbon oil; wherein said wt. % amounts are based upon the total weight of the composition, and where the composition has been prepared by a process comprising dynamically vulcanizing said composition. The foamed thermoplastic elastomer profiles having smooth surfaces, improved low water absorption, improved compression set and compression load deflection.

20 Claims, No Drawings

MICROCELLULAR FOAMS OF THERMOPLASTIC VULCANIZATES

BACKGROUND OF THE INVENTION

1. Field of the Invention

This invention relates generally to foams made from thermoplastic elastomer (TPE) materials. The invention more specifically relates to microcellular TPE foam compositions, and articles therefrom, wherein the TPE are thermoplastic vulcanizates.

2. Description of the Prior Art

Dynamically vulcanized thermoplastic elastomers (thermoplastic vulcanizates) have a combination of both thermoplastic and elastic properties. Such thermoplastic vulcanizates are prepared by mixing and shearing a thermoplastic polymer, a vulcanizable rubber and a curing agent. The vulcanizable rubber is cured and is intimately and uniformly dispersed as a particulate phase within a continuous phase of the thermoplastic polymer. Early work with the vulcanization of the elastomer phase is found in U.S. Pat. No. 3,037,954 which discloses static vulcanization, as well as dynamic vulcanization wherein a vulcanizable elastomer is dispersed into a resinous thermoplastic polymer and the elastomer is cured (crosslinked) while continuously mixing and shearing the blend. U.S. Pat. No. 4,130,535 discloses thermoplastic elastomer compositions comprising thermoplastic olefin resins and olefin copolymer rubbers, prepared by dynamic vulcanization and wherein the rubber component is vulcanized to the extent that it is essentially insoluble in conventional rubber solvents.

Microcellular foams made from thermoplastic compositions are well known. For example, U.S. Pat. No. 6,231,942 describes both method and apparatus for microcellular polypropylene extrusion, and polypropylene articles produced thereby a polymeric microcellular foam article is comprised mainly of homopolymeric polypropylene, or unimodal polypropylene.

Thermoplastic elastomers have been made into microcellular foams as well. U.S. Pat. No. 6,303,666 B1 describes a process for the production of expanded olefinic thermoplastic elastomer product having good external appearance, flexibility and heat resistance. The process includes a gas-dissolving step, adding carbon dioxide to a molten olefinic thermoplastic elastomer selected from specified olefinic thermoplastic elastomers in a proportion of 0.1 to 30 parts by weight of said carbon dioxide per 100 parts by weight of said molten olefinic thermoplastic elastomer, and forming a molten olefinic thermoplastic elastomer composition in which said olefinic thermoplastic elastomer and said carbon dioxide are in a mutually-dissolved state; and as a cooling step, lowering said molten olefinic thermoplastic elastomer composition in temperature. One class of suitable elastomers is a crosslinked product obtained by dynamically heat-treating in the presence of a crosslinking agent a mixture composed of (a) a crosslinking olefin copolymer, which is an ethylene-α-olefin copolymer composed of ethylene and an α-olefin having 3 to 20 carbon atoms or which is an ethylene-α-olefin-non-conjugated diene copolymer composed of ethylene, an α-olefin having 3 to 20 carbon atoms and a non-conjugated diene, and (b) a decomposable olefin plastic, which is a homopolymer or copolymer in which a content of an α-olefin having 3 to 20 carbon atoms is from 50 to 100 mole %.

U.S. Pat. No. 6,613,811 describes microcellular thermoplastic elastomeric polymeric structures. The articles have an average cell size of less than 100 µm and a compression set ranging from less than about 30% to less than about 5%, and a rebound value of at least 50%. The articles may be formed from a thermoplastic elastomeric polyolefin, preferably metallocene-catalyzed polyethylene.

U.S. Pat. No. 6,713,520 B2 describes thermoplastic vulcanizate foam compositions comprising a mixture that includes from about 15 to about 95 percent by weight of the rubber and from about 5 to about 85 percent by weight of a thermoplastic component based upon the total weight of the rubber and thermoplastic component combined, where the thermoplastic component includes from about 65 to about 90 percent by weight of a conventional thermoplastic resin and from about 10 to about 35 percent by weight of a random propylene copolymer based upon the total weight of the thermoplastic component.

WO 2004/016679A2 describes soft thermoplastic vulcanizate foams comprising polyolefin thermoplastic resin, an at least partially crosslinked olefinic elastomer, hydrogenated styrenic block copolymer, and optional additives. The soft foams have smooth surfaces, low water absorption, improved compression set and compression load deflection.

US 20040115418 A1 describes foams with low water absorption, along with thermoplastic elastomeric ("TPE") foam materials and methods of forming the same. In some embodiments, the TPE foams have a low water absorption. Microcellular foams are included. Preferably, the TPE materials include polyolefin thermoplastic vulcanizates (TPVs).

In addition to the above, foamed profiles of such rubbers as ethylene-propylene-diene (EPDM) rubber has been used in vulcanized form as weather seals for the automotive industry, for example, where the object is to reduce road noise, dust, grit, and moisture intake at the various openings, such as window seals, door seals, and trunk seals. The elastomeric characteristics of the EPDM rubber foam allow it to conform to the shapes needed and to be effectively compressed into gaps and corners at the openings of the automotive openings when they are closed such that compressed foam hinders the entry of the noise, dust and moisture. However, the construction of the EPDM rubber foam profiles and vulcanization of the EPDM requires careful and difficult handling. On the other hand, TPV compositions are thermoplastic with a pre-cross-linked rubber phases, e.g., EPDM rubber, and can be much more readily formed into complex shapes as with thermoplastic molding, and retain mechanical strength much longer, and still provide resistance to moisture intake, as well as noise, dirt, etc. However, known TPV foam compositions tend not to provide the level of moisture intake prevention that the EPDM rubber foam compound counterparts do.

SUMMARY OF THE INVENTION

Accordingly, the invention described herein relates to foamed thermoplastic elastomer extrusion profiles having smooth surfaces, improved low water absorption, improved compression set and compression load deflection. This foamed thermoplastic elastomer profile is formed from a thermoplastic elastomer composition having a) a cross-linkable hydrocarbon rubber in the presence of b) a thermoplastic polyolefin resin having a Tm greater than 120° C. wherein said composition comprises:
  a) 25 to 30 wt % of a partially or fully vulcanized reaction product of said cross-linkable hydrocarbon rubber with a cross-linking agent, said reaction product being present as a dispersed phase;
  b) 7 to 12 wt % of said thermoplastic resin as a continuous phase;

c) 8-22 wt % of an elastomeric thermoplastic modifier comprising 1) 3-7 wt. % copolymers of propylene with one or more of ethylene and $C_4$-$C_{10}$ alpha-olefins, said copolymers having a Tm greater than 20° C. and less than 120° C., and, 2) 3-15 wt. % hydrogenated, linear or branched, triblock styrenic copolymers from styrene, isoprene and/or butadiene;

wherein said wt. % amounts are based upon the total weight of the composition, and where the composition has been prepared by a process comprising dynamically vulcanizing said composition.

This thermoplastic elastomer composition can further comprise d) 3-12 wt. % solid filler; and/or e) 35-45 wt. % of non-aromatic hydrocarbon oil; again, wherein said wt. % amounts are based upon the total weight of the composition, and where the composition has been prepared by a process comprising dynamically vulcanizing said composition.

The foamed profiles according to the invention are prepared by subjecting the composition to both supercritical foaming, preferably with supercritical $N_2$, and then extruding through a pressure release die capable of imparting extruded profile shape. Preferred profiles are the transportation vehicle weather seals, particularly those prepared for use in the automotive industry such as mentioned in the Prior Art for EDPM rubber.

DESCRIPTION OF THE PREFERRED EMBODIMENTS

The thermoplastic vulcanizates ("TPV") employed to make foams according to this invention include at least one cured rubber, at least one conventional thermoplastic resin, at least one random polypropylene copolymer, and at least one thermoplastic elastomer styrenic block copolymer. These thermoplastic vulcanizates are foamed by employing supercritical foaming methods.

Any rubber or mixture thereof that is capable of being crosslinked or cured can be used as the rubber component. Reference to a rubber may include mixtures of more than one rubber. Useful rubbers typically contain some degree of unsaturation in their polymeric main chain. Some non-limiting examples of these rubbers include elastomeric ethylene copolymers, butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epichlolorohydrin terpolymer rubber, and polychloroprene. The preferred rubbers are elastomeric ethylene copolymers, such as ethylene-propylene rubber (EPR) and ethylene-propylene-diene rubber (EPDM), and butyl rubber, particular halogenated butyl rubber ("halobutyl rubber").

The term elastomeric ethylene copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. The preferred α-olefins are propylene, 1-hexene, 1-octene or combinations thereof. The diene monomers may include; but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene and the like, or a combination thereof. The preferred diene monomers are 5-ethylidene-2-norbornene and 5-vinyl-2-norbornene. In the event that the copolymer is prepared from ethylene, α-olefin, and diene monomers, the copolymer may be referred to as a terpolymer or even a tetrapolymer in the event that multiple α-olefins or dienes are used.

Elastomeric ethylene copolymers are commercially available under the trade names Vistalon® (ExxonMobil Chemical Co.; Houston, Tex.), Keltan® (DSM Copolymers; Baton Rouge, La.), Nordel® IP (DuPont Dow Elastomers; Wilmington, Del.), ElastoFlo® (Union Carbide; Danbury, Conn.), and Buna® (Bayer Corp.; Germany).

In one embodiment, the elastomeric copolymer is a terpolymer of ethylene, at least one α-olefin monomer, and 5-vinyl-2-norbornene. This terpolymer is advantageous when a peroxide curative is employed as described in U.S. Pat. No. 5,656,693, which is incorporated herein by reference. This terpolymer is also advantageous when a silicon-containing curative is employed in the presence of platinum-containing catalyst as described in International Publication No. WO 98/38226, which is incorporated by reference. The terpolymer preferably includes from about 40 to about 90 mole percent of its polymeric units deriving from ethylene, and from about 0.2 to about 5 mole percent of its polymeric units deriving from vinyl norbornene, based on the total moles of the terpolymer, with the balance comprising units deriving from α-olefin monomer.

The term "butyl rubber" as used herein refers to rubbery amorphous copolymers of isobutylene and isoprene or an amorphous terpolymer of isobutylene, isoprene, and a divinyl aromatic monomer. These copolymers and terpolymers should preferably contain from about 0.5 to about 10 percent by weight, or more preferably from about 1 to about 4 percent by weight, isoprene. The term butyl rubber also includes copolymers and terpolymers that are halogenated with from about 0.1 to about 10 weight percent, or preferably from about 0.5 to about 3.0 weight percent, chlorine or bromine. This chlorinated copolymer is commonly called chlorinated butyl rubber. While butyl rubber is satisfactory for the practice of this invention, halogen-free butyl rubber containing from about 0.6 to about 3.0 percent unsaturation is preferred, with butyl rubber having a polydispersity of about 2.5 or below being especially preferred. Butyl rubbers are commercially prepared by polymerization at low temperature in the presence of a Friedel-Crafts catalyst as disclosed within U.S. Pat. Nos. 2,356,128 and 2,944,576. Butyl rubber is commercially available from a number of sources as disclosed in the Rubber World Blue Book. For example, butyl rubber is available under the tradename Polysar Butyl® (Bayer; Germany) or the tradename Exxon Butyl® (Exxon Chemical Co.). Another suitable copolymer within the scope of the olefin rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from 0.1 to 10 weight percent A preferred example is the brominated copolymer of isobutylene and para-methylstyrene. See U.S. Pat. No. 5,162,445.

Exemplary conventional thermoplastic resins include crystallizable polyolefins, polyimides, polyesters (nylons), and fluorine-containing thermoplastics. Also, the thermoplastic resins may include copolymers of polyolefins with styrene such as styrene-ethylene copolymer. The preferred thermoplastic resins are crystallizable polyolefins that are formed by polymerizing α-olefins such as ethylene, propylene, 1-butene, 1-hexene, 1-octene, 2-methyl-1-propene, 3-methyl-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

Conventional polyolefin thermoplastic resins preferably have a weight average molecular weight from about 200,000 to about 600,000, and a number average molecular weight from about 80,000 to about 200,000. More preferably, these resins have a weight average molecular weight from about 300,000 to about 500,000, and a number average molecular weight from about 90,000 to about 150,000.

Useful conventional thermoplastic resins preferably have a melt temperature (Tm), as measured by differential scanning calorimetry (DSC), that is from about 150 to about 175° C., preferably from about 155 to about 170° C., and even more preferably from about 160 to about 170° C. The glass transition temperature (Tg) of these resins is from about −5 to about 10° C., and preferably from about −3 to about 5° C. The crystallization temperature (Tc) of these resins is from about 95 to about 135° C., and preferably from about 100 to about 120° C. as measured by DSC at 10° C./min. They also preferably have a melt flow rate that is less than about 10 dg/min, preferably less than about 2 dg/min, and still more preferably less than about 1.0 dg/min per ASTM D-1238. The thermoplastic resin of the invention encompasses blends of compatible thermoplastics as well, e.g., combination of 0.8 MFR and 5-15 MFR polypropylene homopolymers or copolymers in any ratio so long as the blend $T_m$ is >120°. Additionally, the use of a small amount, e.g., less than 10 wt. % of the total thermoplastic phase, can be ultra high melt index homopolymer polypropylene, e.g., 750-1500 MI.

An especially preferred thermoplastic resin is a linear, high crystallinity, isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate, that is less than 1.0 dg/min, is highly preferred. Another preferred embodiment is that in which a broad molecular weight propylene homo- or copolymer, or blends of more than one, produced by series reactors, multiple catalysts in a single reactor, or blends of different molecular weight polymers, is used as the thermoplastic phase material. Preferably the molecular weight distribution will be from about 7-15.

The random propylene copolymers are copolymers of propylene and at least one other comonomer, where the comonomer has a statistical distribution throughout the polymer. These random propylene copolymers are known in the art as described in WO 00/69964 and WO 00/69963, and thermoplastic vulcanizates prepared with these copolymers are described in U.S. Pat. No. 6,288,171 B2, which is incorporated herein by reference.

Useful comonomers include ethylene and α-olefins having from 4 to about 20 carbon atoms and preferably from 4 to 8 carbon atoms. Exemplary α-olefins include 1-butene, 1-hexene, 1-octene, 2-methyl-1-propene, 3-methyl-1-pentene, 4-methyl-1-pentene, 5-methyl-1-hexene, and mixtures thereof.

The random propylene copolymers employed in this invention include from about 7 to about 22 percent by weight polymeric units deriving from the comonomer with the balance comprising units deriving from propylene monomer. Preferably, the random propylene copolymer includes from about 9 to about 20 percent by weight, and even more preferably from about 11 to about 18 percent by weight, polymeric units deriving from the comonomer with the balance comprising units deriving from propylene monomer.

The random propylene copolymers have a weight average molecular weight (Mw) from about 5,000 to about 1,000,000, preferably from about 100,000 to about 900,000, and more preferably from about 150,000 to about 800,000. The molecular weights provided within this specification refer to Mw as determined by Gel Permeation Chromatography (GPC) with both polystyrene and low molecular weight polyethylene standards. The random propylene copolymers preferably have a narrow molecular weight distribution (MWD), which is preferably from about 1.5 and about 5.0, more preferably from about 1.7 to about 4.5, and even more preferably from about 1.9 to about 3.2.

The random propylene copolymers may range from amorphous polymers to highly crystalline polymers, including semi-crystalline polymers. Their melt temperature should generally be lower than the decomposition temperature of the rubber. The random propylene copolymer preferably has a single melting point as determined by differential scanning calorimetry (DSC). Preferably, the melt temperature (Tm) is from about 20° to about 100° C., more preferably from about 30° to about 90° C., and even more preferably from about 40° to about 85° C. Their glass transition temperature (Tg) is preferably from about −5 to about −40° C., more preferably from about −10° to about −35° C., and even more preferably from about −15° to about −30° C. The crystallization temperature (Tc) should preferably be from about 10° to about 60° C., more preferably from about 15° to about 55° C., and even more preferably from about 20° to about 50° C.

The random propylene copolymer preferably have a narrow compositional distribution. The composition distribution of the copolymer can be determined by thermal fractionation in a solvent such as hexane or heptane. Typically, approximately 75 percent by weight and more preferably 85 percent by weight of the polymer is isolated as a one or two adjacent, soluble fraction with the balance of the polymer in immediately preceding or succeeding fractions. Each of these fractions has a composition (weight percent ethylene content) with a difference of no greater than 20 weight percent (relative) of the average weight percent ethylene content of the random propylene copolymer component. The random propylene copolymer is narrow in compositional distribution if it meets the fractionation test outlined above.

Also, the compositional distribution of these elastomeric polymers of this invention, as based upon the closest 90 percent of fractionated samples of a given polymer, should not vary by more than 4 percent, preferably by not more than 3 percent, more preferably by not more than 2 percent, and most preferably by not more than 1 percent. In other words, when fractions of a polymer sample are analyzed, the amount of ethylene within each fraction should not vary by more than 4 percent, or as the preferred range may be, for the closest 90 percent of the fractionated samples.

Analytically, the ethylene compositional distribution of a polymer sample may be determined by procedures as described in WO 00/22014 and 00/22015, both of which are incorporated herein by reference.

The random propylene copolymer preferably includes isotactic, crystallizable alpha-olefin sequences, e.g., preferably propylene sequences. The crystallinity is, preferably, from about 2 to about 65 percent of homoisotactic polypropylene and preferably from about 5 to about 40 percent, as measured by the heat of fusion of annealed samples of the polymer (DSC).

The random propylene copolymers have a Mooney Viscosity (ML 1+4@125° C.) of from about 5 to about 35, preferably from about 10 to about 33, and more preferably from about 25 to about 32.

The SBC thermoplastic elastomers useful in the invention are linear or branched triblock copolymers of styrene/conjugated diene/styrene, with the conjugated diene optionally being fully or partially hydrogenated, or mixtures thereof. Generally this triblock copolymer may contain 10 to 50 weight %, more preferably 25 to 35 weight %, of styrene and 90 to 50 weight %, more preferably 75 to 35 weight % of the conjugated diene, based on said block copolymer. Most preferred, however, is a block copolymer which contains 28 to 35 weight % of styrene and 68 to 72 weight % of the conjugated diene. The conjugated diene is selected from butadiene, isoprene or mixtures thereof. Triblock copolymers of the styrene/conjugated diene/styrene type are SBS, SIS, SIBS, SEBS, SEPS, and SEEPS block copolymers, and the branched or star-branched embodiments of them.

These block copolymers useful in the adhesive compositions of the invention are known in the art, and are further described in Canadian Pat. No. 2,193,264 and in International Pat. Applications WO 96/20248; WO 96/23823; WO 98/12240; and WO 99/46330. They are generally prepared by butyl lithium initiated sequential anionic polymerization, but coupling of living S-B/S diblocks or bifunctional initiation are also known methods. See, in general, *Thermoplastic Elastomers* (2nd Ed.), Ch. 3, G. Holden, N. Legge, et al (Hanser Publishers, 1996).

Preferably, the SBC component can be a flexible block copolymer component, which is comprised of a block copolymer containing rigid blocks of vinyl aromatic monomers (S) and statistical, non-rigid mid-blocks of diene/vinyl aromatic monomers (B/S). These block copolymers contain at least the block structure S-B/S-S. The glass transition temperature ($T_g$) of block S is generally above 25° C. and that of the block B/S is generally below 25° C. The B/S block is composed of 75 to 30 weight percent vinyl aromatic monomer and 25 to 70 weight percent diene monomer. Particularly preferred flexible B/S blocks have a vinyl aromatic monomer content of 60 to 40 weight percent and a diene monomer content of 40 to 60 weight percent With respect to the total block copolymer component the diene content is less than 40 weight percent, preferably 35 weight percent, and the portion of the non-rigid B/S blocks amounts to at least 50 weight percent, preferably 70 weight percent. The block copolymer component has a low modulus and yield strength, with high elongation.

Suitable vinyl aromatic monomers include styrene, alkyl-substituted styrenes such as p-methylstyrene, vinyltoluene, as well as mixtures of said monomers. The preferred monomer is styrene. Suitable diene monomers include 1,3-butadiene, isoprene, piperylene, phenylbutadiene, and mixtures of said monomers. The preferred monomer is 1,3-butadiene. The conjugated diene monomer can also be fully or partially hydrogenated. This type flexible block copolymer is commercially exemplified in Styroflex® 2G66 (BASF A.G.).

The amount of the block copolymer component in the composition of the invention generally ranges from 3 to 25 weight percent, based on the total weight of the composition including the thermoplastic elastomer component, additives and the SBC component. The preferred amount of SBC ranges from 3 to 15 weight percent, with 5 to 10 weight percent being most preferred.

In addition to the use of the random propylene copolymers and the SBC thermoplastic elastomers, the thermoplastic phase may additionally include polymeric modifiers of that thermoplastic phase. The polymeric modifiers specifically are those known to provide benefits in overall properties. For instance, long-chain branched thermoplastic resins compatible with the principle thermoplastic phase resin, e.g., polypropylene or high density polyethylene, can increase tensile strength and extensional viscosity, as well as other properties. Long-chain branched thermoplastic resins, which may be referred to herein as LCB-plastics, can generally be described as high molecular weight, highly branched polymers. Reference to a LCB-plastic will include a LCB-plastic or a mixture of two or more LCB-plastics. The LCB-plastics are (i) α-olefin polymers or copolymers, or (ii) copolymers of α-olefins and α-ω-dienes. The α-olefin polymers may include combinations of α-olefin units such as units deriving from propylene and ethylene. Likewise, combinations of α-ω-dienes may be used. The copolymers of α-olefins and α-ω-diene copolymers may be referred to as diene-modified polyolefin polymers. Alternatively, LCB-plastic may be prepared by treating linear crystalline polyolefins with ionizing radiation. This method is disclosed in U.S. Pat. No. 4,916,198, which is incorporated herein by reference. Still further, LCB-plastic may be prepared by polymerizing α-olefins with an insoluble coordination catalyst system. This method is disclosed in U.S. Pat. No. 5,504,171, this is incorporated herein by reference. See, in particular, U.S. Pat. No. 6,433,090 B1 for further description of branch polyolefins and their utility. The amount of the modified LCB-plastic component in the composition of the invention generally ranges from about 1 to about 10 weight percent, based on the total weight of the composition including the thermoplastic resin component, the rubber component, additives and the LCB-plastic component. Commercial LCB products within this class include Profax® SD613 (Montell) and WB 130 HMS® (Borealis).

The polymeric modifiers also specifically includes an acrylic-modified polytetrafluoroethylene (PTFE) component. This component is generally described as a blend of a polytetrafluoroethylene polymer and alkyl(meth)acrylate polymer having alkyl groups of from 5 to 30 carbon atoms. Blends with more than one alkyl(meth)acrylate polymer, or with one or more with different monomers selected from those having alkyl groups of 5 to 30 carbon atoms. A blend which is particularly suited for use in the process of the invention is available as Metablen®, available from Mitsubishi Rayon Co., Ltd. The amount of the modified polytetrafluoroethylene component in the composition of the invention generally ranges from about 0.1 to about 4 weight percent, based on the total weight of the composition including the thermoplastic resin component, the rubber component, additives and the modified polytetrafluoroethylene component. The preferred amount of modified polytetrafluoroethylene ranges from about 0.5 to about 2 weight percent, with about 1 to about 2 weight percent being most preferred. See further description in EP1398352 A1 of the acrylic-modified PTFE and its benefits in thermoplastic resins. See, particularly, U.S. Pat. No. 6,787,607 B2 for the use of such polymeric modifiers in TPV foam compositions.

Any curative that is capable of curing or crosslinking the rubber may be used to cure the rubber component. Some non-limiting examples of these curatives include phenolic resins, peroxides, maleimides, and silicon-containing curatives. Depending on the rubber employed, certain curative may be preferred. For example, where elastomeric copolymers containing units deriving from vinyl norbornene are employed, a peroxide curative may be preferred because the required quantity of peroxide will not have a deleterious impact on the engineering properties of the thermoplastic phase of the thermoplastic vulcanizate. In other situations, however, it may be preferred not to employ peroxide curatives because they may, at certain levels, degrade the thermoplastic components of the thermoplastic vulcanizate. Accordingly, some thermoplastic vulcanizates of this invention are cured in the absence of peroxide, or at least in the absence of an amount of peroxide that will have a deleterious impact on the engineering properties of the thermoplastic vulcanizate, which amount will be referred to as a substantial absence of peroxide. In these situations, phenolic resins or silicon-containing curative are preferred.

Any phenolic resin that is capable of crosslinking a rubber polymer can be employed in practicing the present invention. U.S. Pat. Nos. 2,972,600 and 3,287,440 are incorporated herein in this regard. The preferred phenolic resin curatives can be referred to as resole resins and are made by condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylol phenols or phenolic resins, substituted in para-positions with alkyl groups containing 1 to about 10 carbon atoms are preferred. In one embodiment, a blend of octyl phenol and nonylphenol-formaldehyde resins are employed. The blend may include from about 25 to about 40% by weight octyl phenol and from about 75 to about 60% by weight nonylphenol (optionally from about 30 to about 35 weight percent octyl phenol and from about 70 to about 65 weight percent nonylphenol). In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids. These phenolic curatives are typically thermosetting resins and may be referred to as phenolic resin curatives or phenolic resins. These phenolic resins are ideally used in conjunction with a catalyst system. For example, non-halogenated phenol curing resins are preferably used in conjunction with halogen donors and, optionally, a hydrogen halide scavenger. Where the phenolic curing resin is halogenated, a halogen donor is not required but the use of a hydrogen halide scavenger, such as ZnO, is preferred. For a further discussion of phenolic resin curing of thermoplastic vulcanizates, reference can be made to U.S. Pat. No. 4,311,628, which is incorporated herein by reference.

When used, peroxide curatives are generally selected from organic peroxides. Examples of organic peroxides include, but are not limited to, di-tert-butyl peroxide, dicumyl peroxide, t-butylcumyl peroxide, α, α-bis(tert-butylperoxy)diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy) valerate, benzoyl peroxide, lauroyl peroxide, dilauroyl peroxide, 2,5-dimethyl-2,5-di(tert-butylperoxy) hexene-3, and mixtures thereof. Also, diaryl peroxides, ketone peroxides, peroxydicarbonates, peroxyesters, dialkyl peroxides, hydroperoxides, peroxyketals and mixtures thereof may be used. For a further discussion of peroxide curatives and their use for preparing thermoplastic vulcanizates, reference can be made to U.S. Pat. No. 5,656,693, which is incorporated herein by reference.

Useful silicon-containing curatives generally include silicon hydride compounds having at least two SiH groups. These compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethylsiloxane copolymers, alkyl methyl polysiloxanes, bis(dimethylsilyl)alkanes, bis(dimethylsilyl) benzene, and mixtures thereof.

As noted above, hydrosilylation curing of the elastomeric polymer is preferably conducted in the presence of a catalyst. These catalysts can include, but are not limited to, peroxide catalysts and catalysts including transition metals of Group VIII. These metals include, but are not limited to, palladium, rhodium, and platinum, as well as complexes of these metals. Platinum catalyst are preferred. For a further discussion of the use of hydrosilylation to cure thermoplastic vulcanizates, reference can be made to U.S. Pat. No. 5,936,028, which is incorporated herein by reference. When silicon-containing curatives are employed, the elastomeric copolymer employed will preferably include 5-vinyl-2-norbornene as the diene component.

Plasticizers, extender oils, synthetic processing oils, or a combination thereof may be employed in the thermoplastic vulcanizates. The extender oils may include, but are not limited to, aromatic, naphthenic, and, particularly, paraffinic extender oils derived from mineral oils. The preferred synthetic processing oils are polylinear α-olefins. Thus in addition to petroleum-derived rubber process oils, oligomeric and low molecular weight polymer oils polymerized from unsaturated monomers separated from petroleum fractions The compositions of this invention may include plasticizers such as the organic esters, alkyl ethers, or combinations thereof, in U.S. Pat. Nos. 5,290,886 and 5,397,832. The addition of certain low to medium molecular weight organic esters and alkyl ether esters to the compositions of the invention dramatically lowers the Tg of the polyolefin and rubber components, and of the overall composition, and improves the low temperature properties, particularly flexibility and strength. These organic esters and alkyl ether esters generally have a molecular weight that is generally less than about 10,000. It is believed that the improved effects are achieved by the partitioning of the low Tg ester into both the polyolefin and rubber components of the compositions. Particularly suitable esters include monomeric and oligomeric materials having an average molecular weight below about 2000, and preferably below about 600. The esters found to be most suitable were either aliphatic mono- or diesters or alternatively oligomeric aliphatic esters or alkyl ether esters.

In addition to the thermoplastic resins, rubber, curatives and optional extender oils, the compositions of the invention may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber or plastics compounding arts. These additives can comprise up to about 50 weight percent of the total composition. Fillers and extenders that can be utilized include conventional inorganics such as calcium carbonate, clays, silica, talc, titanium dioxide, carbon black and the like.

Preferably, compositions of this invention will contain a sufficient amount of the rubber to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the thermoplastic vulcanizates of the present invention should comprise at least about 25 percent by weight rubber. More specifically, the thermoplastic vulcanizates include from about 15 to about 95 percent by weight, preferably from about 45 to about 90 percent by weight, and more preferably from about 60 to about 88 percent by weight rubber, based on the total weight of the rubber and thermoplastic component.

The thermoplastic vulcanizates employed in this invention include a thermoplastic component that includes the conventional thermoplastic resin and the random propylene copolymer. Preferably, the thermoplastic vulcanizates include from about 5 to about 85 percent by weight, more preferably from about 10 to about 55 percent by weight, and even more preferably from about 12 to about 40 percent by weight of the thermoplastic component based on the total weight of the rubber and thermoplastic component combined.

The thermoplastic component includes from about 65 to about 90 percent by weight, preferably from about 70 to about 85 percent by weight, and even more preferably from about 75 to about 80 percent by weight conventional thermoplastic resin. Accordingly, the thermoplastic component also includes from about 10 to about 35 percent by weight, preferably from about 15 to about 30 percent by weight, and more preferably from about 20 to about 25 percent by weight random propylene copolymer. It has been surprisingly discovered that the relative amount of conventional thermoplastic resin to random propylene copolymer significantly alters the properties and usefulness of the resulting foam. For example, where the ratio of conventional thermoplastic resin to random propylene copolymer is too high, the resulting foams suffer from high stiffness and high hardness, which translate into high compression load deflection. On the other hand, where the ratio of random propylene copolymer to conventional thermoplastic resin is too high, the resulting foams suffer from poor high temperature performance (e.g., compression set increases) and processability is poor due to high melt viscosity, which ultimately results in poor foamability and poor surface appearance.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired. The amount of vulcanizing agent should be sufficient to at least partially vulcanize the elastomeric polymer. Preferably, the rubber is completely vulcanized.

Where a phenolic resin curative is employed, a vulcanizing amount of curative preferably comprises from about 1 to about 20 parts by weight, more preferably from about 3 to about 16 parts by weight, and even more preferably from about 4 to about 12 parts by weight, phenolic resin per 100 parts by weight rubber.

Where a peroxide curative is employed, a vulcanizing amount of curative preferably comprises from about $1 \times 10^{-4}$ moles to about $2 \times 10^{-2}$ moles, more preferably from about $2 \times 10^{-4}$ moles to about $2 \times 10^{-3}$ moles, and even more preferably from about $7 \times 10^{-4}$ moles to about $1.5 \times 10^{-3}$ moles per 100 parts by weight rubber.

Where silicon-containing curative is employed, a vulcanizing amount of curative preferably comprises from 0.1 to about 10 mole equivalents, and preferably from about 0.5 to about 5 mole equivalents, of SiH per carbon-carbon double bond.

Generally, from about 5 to about 300 parts by weight, preferably from about 30 to about 250 parts by weight, and more preferably from about 70 to about 200 parts by weight, of extender oil, or plasticizer, per 100 parts rubber is added. The quantity of extender oil or plasticizer added depends upon the properties desired, with the upper limit depending upon the compatibility of the particular oil and blend ingredients; this limit is exceeded when excessive exudation of extender oil or plasticizer occurs.

Carbon black may be added in amount from about 5 to about 250, and more preferably from about 5 to about 100 parts by weight per 100 parts by weight of rubber and thermoplastic material combined. The amount of carbon black that can be used depends, at least in part, upon the type of carbon black and the amount of extender oil that is used. The amount of extender oil depends, at least in part, upon the type of rubber. High viscosity rubbers are more highly oil extendable.

The thermoplastic elastomers may be prepared by blending and dynamically vulcanizing, which are techniques that are well known in the art. Advantageously, the thermoplastic elastomers can be prepared in a one-step process whereby the rubber, conventional thermoplastic resin, and random propylene copolymer are blended and the rubber is dynamically vulcanized within the blend in one step. See, S. Abdou-Sabet, R. C. Puydak, and C. P. Rader, "Dynamically Vulcanized Thermoplastic Elastomers", *Rubber Chemistry and Technology*, V. 69, No. 3, July-August 1996, and patent references cited therein. Alternatively, a thermoplastic elastomer containing no random propylene copolymer or only a portion of the random propylene copolymer can first be prepared in one step and the random propylene copolymer can be added to the thermoplastic elastomer in the molten state, i.e., the random propylene copolymer can be compounded into the thermoplastic elastomer. Similarly the SBC can be added in the first compounding, or added in a second step, second pass, or second reactor. It can be added with the random propylene copolymer as well.

The term dynamic vulcanization refers to a vulcanizing or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. Twin screw extruders are particularly useful in the invention process.

The term vulcanized or cured rubber refers to an elastomeric polymer that has undergone at least a partial cure. The degree of cure can be measured by determining the amount of gel, or conversely, the rubber that is extractable from the thermoplastic elastomer by using boiling xylene or cyclohexane as an extractant. This method is disclosed in U.S. Pat. No. 4,311,628. By using this method as a basis, the cured rubber of this invention will have a degree of cure where not more than 35 percent of the rubber is extractable, preferably not more than 15 percent, even more preferably not more than 10 percent, and still more preferably not more than 5 percent of the rubber is extractable. Alternatively, the degree of cure may be expressed in terms of crosslink density. Preferably, the crosslink density is from about 40 to about 160 moles per milliliter of rubber. All of these descriptions are well known in the as and described in U.S. Pat. Nos. 5,100,947 and 5,157,081, which are incorporated herein by reference.

Despite the fact that the rubber component is partially or fully cured, the compositions of this invention can be processed and reprocessed by conventional plastic processing techniques such as extrusion, injection molding, and compression molding. The rubber within the thermoplastic elastomers of this invention is usually in the form of finely-divided and well-dispersed particles of vulcanized or cured rubber, although a co-continuous morphology or a phase inversion is also possible.

The thermoplastic vulcanizates of this invention can be foamed by the process described in US2004/0115418 A1, the foaming process of which is incorporated by reference in accordance with U.S. patent practice. This process uses supercritical gas injected into the TPV foam material as it is being extruded. Upon exit from the extruder, the supercritical gas bubbles expand to foam the TPV composition in the shape formed by the extruder die exit. The examples below further illustrate the process.

The microcellular TPV foam profiles according to the invention can include, for example, car parts or components such as instrument panel skins, door skins, expanded backings for instrument panel skins and door skins, door trims, pillars, console boxes, steering wheels, shift levers, air boxes, dash panels, replaceable seat cushions, differential gear garnishes, curl top garnishes, ceiling materials, weather strip sponges, trunk room linings, engine room linings, bumpers, fenders, hood surface layers, side shields, and cushions; motorcycle parts and components such as handlebar grips, helmet linings, seats, and surface layers for racing suits; parts and products for office automation (OA) equipments, such as mice, keyboards, and housings for OA equipments, mouse pads, desk mats; headphones; electronic calculators; telephone handsets; housings for PHS (personal handy-phone system), other mobile phones and the like; miscellaneous goods such as system pocketbooks, wallets, notebooks, document holders, bags, toilet seats, pencils, ballpoint pens, fountain pens, carpets, handles for kitchen knives, and grips for hedge shears or trimmers; footwear such as sandals, slippers, shoe soles and sandals; electric parts such as wire coverings, connectors, caps, and plugs; construction materials such as cut-off boards, sealing sponges, and noise barrier walls; equipments for leisure time amusement, such as grips for golf clubs, grips for baseball bats, grips for tennis rackets, fins for skin diving, and swimming goggles; miscellaneous industrial items such as gaskets, waterproof sheets, garden hoses, drive belts, and industrial packings.

The present invention will hereinafter be described by Examples. It is however to be noted that the contents of the present invention shall not be limited to the Examples.

EXAMPLES

The following measurement methods were used in evaluating the examples of the invention:

The density was determined in g/cc using a Mettler Toledo AG104 densimeter using ethanol as a medium.

Tensile strength at break; tensile set; tensile modulus; elongation at break—ASTM D412 (ISO 37, type 2) 1
Shore hardness—ASTM D2240
Specific gravity (SG)—ASTM D792
Surface (Ra)—Surface finish was evaluated as the arithmetic average of roughness irregularities measured from a mean line with the sampling length, using a Surface Analyzer System from Federal Products Corporation, Providence, R.I.
Compression set—The sample was compressed inside spaced sample holders to 50% of its initial height, and held at 70° C. for 22 hours. The sample was removed and allowed to recover for 30 minutes at room temperature. Compression set was then determined as: $CS(\%)=(H\ initial - H\ final)/(H\ initial - H\ 0) \times 100$, where H 0 is so the gap of the sample holder (60% of H initial).
Compression load deflection—The force necessary to compress a 100 mm sample to 50% of its original height, at room temperature.
Submerged water absorption test—Complete submersion water absorption, in the context of the present invention, is measured by completely immersing an entire sample in water under high vacuum, for example according to ASTM D 1056 Sections 42 through 48. The sample is weighed before and after immersion. The water absorption is defined by the percentage increase in weight of the sample. For the water absorptions described herein, the entire sample is immersed in water including ends of the sample. The technique used herein is to be distinguished from techniques that do not completely immerse the entire sample such as the U-test water absorption described below which allows sample ends to remain out of the water. Such techniques that allow sample ends to remain out of the water have a tendency to have lower water absorption values (in particular, for open cell foams) because the technique does not account for water that would be absorbed into the cell structure via the sample ends (lower values may be compounded, for example, when surfaces of the article, which are selectively submerged, have been treated with a hydrophobic substance).
The complete submersion water absorption test procedure generally followed that outlined in ASTM D 1056-00 "Standard Specifications for Flexible Cellular Materials—Sponge or Expanded Rubber" Sections 42 through 48. Modifications or elaborations on the ASTM test method were:
Standard bottled water was used rather than distilled water. Samples were tested in the shapes as produced. Blot drying was performed on all surfaces exposed to water including inner surfaces on tubular samples. All samples were 50 mm (1.97") long.

Microcellular foams were made generally in accordance with the following description:

Extrusion Equipment:

A line for the production of extruded profiles was assembled employing a 2½ in. (63 mm) diameter, 32:1 L:D single screw extruder (Akron Extruders, Canal Fulton, Ohio). An injection system for the injection of $N_2$ into the extruder was placed at approximately 8 diameters from the exit of the extruder. The injection system included 2 equally spaced circumferential, radially positioned ports, each port including 176 orifices, each orifice of 0.020 inch (0.5 mm) diameter, for a total of 352 orifices. The injection system included an air actuated control valve to precisely meter a mass flow rate of blowing agent at rates from 0.04 to 3.5 lbs/hr (0.022 to 1.6 kg/hr) at pressures up to 5500 psi (38 MPa).

The screw of the primary extruder was a specially designed screw to provide feeding, melting and mixing of the polymer/talc concentrate followed by a mixing section for the dispersion of blowing agent in the polymer.

Connected to the exit of the extruder was a horizontally mounted, in-line extrusion annular profile die. The head was designed by Trexel Inc. (Woburn, Mass.) and was equipped with taps for measurement of melt temperature and pressure just prior to entry into the die. It employed a conventional 3-spider type flow distribution channel and a die adjustment system that allowed movement of the die relative to the fixed position tip. This feature provides the ability to produce uniform wall thickness by "centering" the die to the mandrel. A wide range of exit gaps and exit taper angles were possible depending upon the chosen tooling design. The head was also equipped with an air channel and regulator that allowed the introduction and control of air pressure through the center of the head. This feature allowed the use of air to cool and support the ID of hollow profiles when used in conjunction with extrusion tips designed with an appropriate air passageway.

Upon exit from the die, the extrudate entered a cooling trough of approximately 10 feet in length. The trough was equipped with a closed loop water cooling system, flow controls and spray heads. The system was plumbed and adjusted to provide a fixed water level in the trough to support and cool the extrudate. Spray heads were mounted along the trough length to cool the entire perimeter of the extrudate. Air nozzles were provided at the end of the trough to remove the water from the outer surface of the extrudate.

A standard, 36 inch (90 cm) length belt hauloff (Custom Downstream Systems, St. Laurent, Quebec, Canada) equipped with a variable speed drive was placed at the exit of the water trough. This system pulled the extrudate through the cooling trough at constant speed to provide the target product dimensions.

EXAMPLES

Samples 1-9

Initially nine thermoplastic vulcanizates were prepared by dynamically vulcanizing a rubber with a phenolic resin. The type and amount of extender oil was varied as set forth in Table I.

The thermoplastic vulcanizates of Samples 1-9 were prepared by employing conventional techniques using a twin screw mixer. The following ingredients were used in each sample. The ingredients included 100 parts by weight rubber, 150 parts by weight plasticizing oil, 2 parts by weight zinc oxide, 1.3 parts by weight stannous chloride, and 12 parts by weight carbon black concentrate (5.6 parts carbon black and 8.3 parts polypropylene), as set forth in Table I.

The elastomeric copolymer was poly(ethylene-co-propylene-co-5-ethylidene-2-norbornene) obtained under the tradename VISTALON™ 3666 (ExxonMobil). Sample 1 included 12 parts by weight of the SEPS copolymer Septon 2002 characterized by polystyrene content of about 30 percent by weight and 42 parts of Icecap K clay (Burgess Pigment Company). The SEPS copolymer was a hydrogenated styrene-isoprene-styrene block copolymer and was obtained under the tradename SEPTON™ 2002 (Kuraray). Sample 2 included 16.85 part of propylene copolymer "VMX 3000", the propylene copolymer was characterized by ethylene content of about 12 percent by weight and MFR about 8 dg/min ASTM D1238, 2.16 kg, 230° C.) and was obtained under the tradename VISTAMAXX™ 3000 (Exxon Mobil). Sample 3 included 30 parts of Hifax 7334XEP (Montel). Sample 4 included V707, an ethylene copolymer (ExxonMobil). Samples 5-9 included 17 parts of VMX 3000. Samples 2-7, and samples 8-9 contained a certain amount of Mistron vapor talc (Luzenac Americas) and Omycarb FT (Omya Inc.), respectively, as indicated in Table 1. All samples contained a certain amount of propylene homopolymer PP 5341 (MFI about 0.8 g/min, ExxonMobil). Samples 7 and 8 contained an additional homopolymer, D036-W6 (a homopolymer PP with a MFR of about 5 dg/min, SUNOCO) or PP 1024 (a homopolymer PP with a MFR of about 12 dg/min, ExxonMobil). Sample 9 included 18.25 parts of Septon 2002, previously described and 11 parts WB 130 HMS (branched polypropylene, MFR about 5, BOREALIS). Samples 1-5, and samples 6-9 included 3.5 parts and 4.5 parts of phenolic crosslinking agent, respectively. The paraffinic oil that was characterized by viscosity (ASTM D 445@40° C.) of about 110 CST and was obtained under the tradename SUNPAR™ 150M (SUNOCO). The polypropylene homopolymer was characterized by an MFR of about 0.8 dg/min. The amounts provided in Table I, as well as other tables in this specification, are provided in parts by weight per 100 parts by weight rubber (phr) unless otherwise specified.

The polypropylene homopolymer was characterized by an MFR of about 0.8 dg/min. The amounts provided in Table I, as well as other tables in this specification, are provided in parts by weight per 100 parts by weight rubber (phr) unless otherwise specified. In these table entries, a "C" indicates the sample is provided as a comparative example, the other examples are of the invention.

TABLE I

| | TPV ⇒ | | | | | | | | |
|---|---|---|---|---|---|---|---|---|---|
| Material name | 1C | 2C | 3C | 4C | 5 | 6 | 7 | 8 | 9 |
| V3666 rubber | 175 | 175 | 175 | 175 | 175 | 175 | 175 | 175 | 175 |
| Matron Vapor talc | — | 12 | 12 | 12 | 24 | 24 | 24 | — | — |
| Exxon PP 5341 | 35 | 18 | 26 | 26 | 24 | 24 | 24 | 24 | 24 |
| Ampacet ™ 49974 | 13.9 | 13.9 | 13.9 | 13.9 | 13.9 | 13.9 | 13.9 | 13.9 | 13.9 |
| Sunpar 150M | 75 | 75 | 75 | 75 | 75 | 75 | 75 | 75 | 75 |
| SP-1045 resin | 3.5 | 3.5 | 3.5 | 3.5 | 3.5 | 4.5 | 4.5 | 4.5 | 4.5 |
| Septon ™ 2002 | 12 | — | — | — | — | — | — | — | 18.25 |
| Zinc oxide | 2 | 2 | 2 | 2 | 2 | 2 | 2 | 2 | 2 |
| Stannous chloride | 1.26 | 1.26 | 1.26 | 1.26 | 1.26 | 1.26 | 1.26 | 1.26 | 1.26 |
| VMX 3000 | — | 16.85 | — | — | 17 | 17 | 17 | 17 | 17 |
| Icecap K clay | 42 | — | — | — | — | — | — | — | — |
| Borealis WB130 HMS | — | — | — | — | — | — | — | — | — |

TABLE I-continued

|  | TPV ⇒ | | | | | | | | |
|---|---|---|---|---|---|---|---|---|---|
| Material name | 1C | 2C | 3C | 4C | 5 | 6 | 7 | 8 | 9 |
| Hifax 7334 XEP | — | — | 30 | — | — | — | — | — | — |
| V707 | — | — | — | 25 | — | — | — | — | — |
| 1024-E4 | — | — | — | — | — | — | 10 | — | — |
| Omyacarb ™ FT | — | — | — | — | — | — | — | 24 | 24 |
| WB130 HMS | — | — | — | — | — | — | — | — | 11 |
| D-036-W6 | — | — | — | — | — | 10 | — | — | — |
| Total phr | 359.66 | 317.51 | 338.66 | 333.66 | 335.66 | 346.66 | 346.66 | 336.66 | 365.91 |

The physical properties of TPV sample 1-9 are given in Table 2. Shore hardness was determined according to ASTM D-2240 and Specific gravity by ASTM D792. Ultimate tensile strength, ultimate elongation, and 100% modulus were determined according to ASTM D-412 at 23C by using an Instron testing machine. Weight gain was determined according to ASTM D-471. Tension set was determined according to ASTM D-142. LCR viscosity was measured by with a Dynisco™ capillary remoter at 30:1 aspect ratio at 1,200 $S^{-1}$ @204° C.

TPVs Samples 1-9 were either commercial (1C) or were compounded in a single pass melt processing/reaction step or subsequently blended with additional quantities of plastic or modifiers before foaming using supercritical gases (N2 or CO2). Samples 1-4 were used as it is and are shown as comparative examples. Samples 9-16 are the inventive examples. TPV 10-13 were prepared by melt blending TPV5, 6, 7 with specified amount (see Table III) of Septon™ 2002 in twin screw extruder. Samples 12 and 13 have the same composition. TPV 14 was prepared by dry blending pellets of TPV2 with specified amounts of Septon™ 2002 and WB 130 HMS. TPV 15 was prepared by melt blending TPV8 with specified amounts of Septon™ 2002 and WB 130 HMS on twin screw extruder. TPV16 was prepared by melt blending TPV8 with specified amounts of Septon™ 2002 and Metablen™ KA2392 using twin screw extruder. The samples thus prepared were used for extrusion foaming using supercritical N2.

TABLE II

|  | TPV ⇒ | | | | | | | | |
|---|---|---|---|---|---|---|---|---|---|
|  | 1C | 2C | 3C | 4C | 5 | 6 | 7 | 8 | 9 |
| Hardness, Shore A | 60.8 | 52.6 | 52.9 | 49.1 | 57.3 | 63.5 | 63.9 | 54.9 | 62.1 |
| UTS, psi | 574 | 699 | 736 | 625 | 734 | 799 | 762 | 662 | 614 |
| UTS, MPa | 4.0 | 4.8 | 5.1 | 4.3 | 5.1 | 5.5 | 5.3 | 4.6 | 4.2 |
| UE, % | 412 | 439 | 490 | 481 | 470 | 437 | 429 | 490 | 451 |
| M100, psi | 275 | 221 | 222 | 201 | 251 | 305 | 322 | 220 | 268 |
| M100, MPa | 1.9 | 1.5 | 1.5 | 1.4 | 1.7 | 2.1 | 2.2 | 1.5 | 1.8 |
| Wt Gain, % | 123.5 | 148.5 | 166.5 | 188 | 145 | 112 | 118 | 163 | 137 |
| LCR (1200 1/s) | 75.20 | 81 | 76.1 | 90.2 | 81.8 | 68.1 | 72.6 | 79.5 | 67.5 |
| Hardness, Shore A | 60.8 | 52.6 | 52.9 | 49.1 | 57.3 | 63.5 | 63.9 | 54.9 | 62.1 |
| UTS, psi | 574 | 699 | 736 | 625 | 734 | 799 | 762 | 662 | 614 |
| UE, % | 412 | 439 | 490 | 481 | 470 | 437 | 429 | 490 | 451 |
| M100, psi | 275 | 221 | 222 | 201 | 251 | 305 | 322 | 220 | 268 |
| Wt Gain, % | 123.5 | 148.5 | 166.5 | 188 | 145 | 112 | 118 | 163 | 137 |
| LCR (1200 1/s) | 75.20 | 81 | 76.1 | 90.2 | 81.8 | 68.1 | 72.6 | 79.5 | 67.5 |

TABLE III

|  | TPV ⇒ | | | | | | | | | | | |
|---|---|---|---|---|---|---|---|---|---|---|---|---|
|  | 1C | 2C | 3C | 4C | 10 | 11 | 12 | 13 | 14 | 15 | 16 | 9 |
| Material, wt. % | | | | | | | | | | | | |
| TPV1C | 100 | — | — | — | — | — | — | — | — | — | — | — |
| TPV2C | — | 100 | — | — | — | — | — | — | 92 | — | — | — |
| TPV3C | — | — | 100 | — | — | — | — | — | — | — | — | — |
| TPV4C | — | — | — | 100 | — | — | — | — | — | — | — | — |
| TPV5 | — | — | — | — | 95 | — | — | — | — | — | — | — |
| TPV6 | — | — | — | — | — | 96 | — | — | — | — | — | — |
| TPV7 | — | — | — | — | — | — | 96 | 96 | — | — | — | — |

TABLE III-continued

| | TPV ⇒ | | | | | | | | | | | |
|---|---|---|---|---|---|---|---|---|---|---|---|---|
| | 1C | 2C | 3C | 4C | 10 | 11 | 12 | 13 | 14 | 15 | 16 | 9 |
| TPV8 | — | — | — | — | — | — | — | — | — | 92 | 93.4 | — |
| TPV9 | — | — | — | — | — | — | — | — | — | — | — | 100 |
| Septon ™ 2002 | — | — | — | — | 5 | 4 | 4 | 4 | 5 | 5 | 5 | — |
| Metablen ™ KA2392 | — | — | — | — | — | — | — | — | — | — | 1.6 | — |
| Borealis WB130 HMS | — | — | — | — | — | — | — | — | 3 | 3 | — | — |
| -Total, wt. % | 100 | 100 | 100 | 100 | 100 | 100 | 100 | 100 | 100 | 100 | 100 | 100 |

TABLE IV

| | TPV ⇒ | | | | | | | |
|---|---|---|---|---|---|---|---|---|
| | 10 | 11 | 12 | 13 | 14 | 15 | 16 | 9 |
| Hardness, Shore A | 53.4 | 64.8 | 62.8 | 62.8 | 50 | 61.5 | 55.4 | 62.1 |
| UTS, psi | 601 | 659 | 664 | 664 | 675 | 606 | 544 | 614 |
| UTS, MPa | 4.1 | 4.5 | 4.6 | 4.6 | 4.7 | 4.2 | 3.8 | 4.2 |
| UE, % | 482 | 416 | 405 | 405 | 348 | 412 | 444 | 451 |
| M100, psi | 199 | 270 | 276 | 276 | 262 | 263 | 209 | 268 |
| M100, MPa | 1.4 | 1.9 | 1.9 | 1.9 | 1.8 | 1.8 | 1.4 | 1.8 |
| Wt Gain, % | 151 | 124 | 129 | 129 | 140.6 | 145 | 160 | 137 |
| LCR (1200 1/s) | 66.8 | 69.9 | 67.2 | 67.2 | 70.3 | 65.7 | 75.1 | 67.5 |

TABLE V

| | TPV ⇒ | | | | | | | | | | | |
|---|---|---|---|---|---|---|---|---|---|---|---|---|
| | 1C | 2C | 3C | 4C | 10 | 11 | 12 | 13 | 14 | 15 | 16 | 9 |
| SG | 0.63 | 0.62 | 0.64 | 0.67 | 0.52 | 0.56 | 0.58 | 0.52 | 0.53 | 0.45 | 0.58 | 0.45 |
| Foam, UTS (PSI) | 261 | 253 | 271 | 196 | 303 | 341 | 362 | 287 | 317 | 267 | 306 | 258 |
| Foam, UTS (Mpa) | 1.80 | 1.74 | 1.87 | 1.35 | 2.09 | 2.35 | 2.5 | 1.98 | 2.19 | 1.84 | 2.11 | 1.78 |
| Foam UE, % | 112 | 189 | 208 | 209 | 269 | 271 | 276 | 217 | 272 | 171 | 382 | 232 |
| Set (50%, 70° C. for 22 hrs) | 40 | 38 | 44 | 47 | 45.3 | 40.1 | 45 | 39.1 | 44 | 45.4 | 43.9 | 47.6 |
| Vacuum H₂O abort., wt. % | 4 | 1 | 1 | 9 | 6.9 | 27.9 | 5.4 | 13.3 | 26 | 25 | 6 | 23.9 |
| Surface, Ra - mm | 4.5 | 9.5 | 12.5 | 6.3 | 5.6 | 6.3 | 6.4 | 7.3 | 5.4 | 5.4 | 3.6 | 9.9 |
| 50% Compress ion Load Deflect. (N/100 mm) | 8.6 | 8.7 | 8.6 | 10.3 | 5.72 | 10.42 | 8.84 | 8.79 | 8.7 | 6.44 | 6.13 | 8.94 |

The inventive example gave better foamability (lower density), better physical properties (UTS, ULE), improved surface characteristics (smoother surface) than the control samples.

The rheological properties of the inventive examples were (LCR in the range of 60-75 Pa·s at 1200 1/s) were better suited for use of the Mucell™ process (commercial foaming process using supercritical gas) for microcellular TPV foams than were the control samples.

I claim:

1. A foamable thermoplastic elastomer composition prepared by the process comprising dynamically vulcanizing a) a cross-linkable hydrocarbon rubber in the presence of b) a thermoplastic polyolefin resin having a Tm greater than 120° C. wherein said composition comprises:
    a) 25 to 30 wt % of a partially or fully vulcanized reaction product of said cross-linkable hydrocarbon rubber with a cross-linking agent, said reaction product being present as a dispersed phase;
    b) 7 to 12 wt % of said thermoplastic resin as a continuous phase; and,
    c) 8-22 wt % of an elastomeric thermoplastic modifier comprising 1) 3-7 wt. % copolymers of propylene with one or more of ethylene and $C_4$-$C_{10}$ alpha-olefins, said copolymers having a Tm greater than 20° C. and less than 120° C., and, 2) 3-15 wt. % hydrogenated, linear or branched triblock styrenic copolymers from styrene, isoprene and/or butadiene, wherein said wt. % amounts are based upon the total weight of the composition.

2. The composition of claim 1 further comprising:
    d) 3-12 wt % solid filler; and/or
    e) 35-45 wt. % of a non-aromatic hydrocarbon oil, wherein said wt. % amounts are based upon the total weight of the composition.

3. The composition of claim 1 wherein said cross-linkable rubber is EPDM or halobutyl rubber.

4. The composition of claim 1 wherein said thermoplastic resin is a combination of 0.8 MFR and 5-15 MFR polypropylene homopolymers or copolymers.

5. The composition of claim 2 wherein said reaction product rubber has been vulcanized such that not more than 5 wt. % non-crosslinked rubber is extractable in boiling xylene.

6. The composition of claim 2 wherein said reaction product rubber has been cross-linked such that more than 5 wt. % but less than 30 wt. % non-crosslinked rubber is extractable in boiling xylene.

7. The method of claim 1 wherein said hydrogenated, triblock copolymer is a styrene-ethylene-propylene-styrene copolymer.

8. The composition of claim 1 additionally comprising 1.5-8 wt. % of one or both of 1) acrylic-modified polytetrafluoroethylene (PTFE) modifier and 2) a long-chain branched polyolefin.

9. The compound of claim 1 characterized in having an LCR less than 75 Pa·s/1200 sec$^{-1}$.

10. A foamed thermoplastic elastomer profile comprising a thermoplastic vulcanizate composition comprising a) a cross-linkable hydrocarbon rubber in the presence of b) a thermoplastic polyolefin resin having a Tm greater than 120° C. wherein said composition comprises:
   a) 25 to 30 wt % of a partially or fully vulcanized reaction product of said cross-linkable hydrocarbon rubber with a cross-linking agent, said reaction product being present as a dispersed phase;
   b) 7 to 12 wt % of said thermoplastic resin as a continuous phase;
   c) 8-22 wt % of an elastomeric thermoplastic modifier comprising 1) 3-7 wt. % copolymers of propylene with one or more of ethylene and $C_4$-$C_{10}$ alpha-olefins, said copolymers having a Tm greater than 20° C. and less than 120° C., and, 2) 5-15 wt. % hydrogenated, triblock styrenic copolymers from styrene, isoprene and/or butadiene;

wherein said wt. % amounts are based upon the total weight of the composition.

11. The profile of claim 10 wherein the thermoplastic vulcanizate composition further comprises:
   d) 3-12 wt % solid filler; and/or
   e) 35-45 wt. % of a non-aromatic hydrocarbon oil,
wherein said wt. % amounts are based upon the total weight of the composition.

12. The profile of claim 10 wherein said hydrogenated, triblock copolymer is a styrene-ethylene-propylene-styrene (SEPS) copolymer.

13. The profile of claim 10 where shaped to serve as a weatherseal article in a transportation vehicle.

14. The profile of claim 10 where said weather seal article is for an automotive vehicle as a window, door or trunk seal.

15. A method for the manufacture of a foamed profile comprising:
   a) foaming by the introduction of supercritical gas into a melted or molten thermoplastic elastomer composition that is a dynamically vulcanized thermoplastic elastomer composition that comprises:
      i) 25 to 30 wt % of a partially or fully vulcanized reaction product of said cross-linkable hydrocarbon rubber with a cross-linking agent, said reaction product being present as a dispersed phase;
      ii) 7 to 12 wt % of said thermoplastic resin as a continuous phase;
      iii) 8-22 wt % of an elastomeric thermoplastic modifier comprising 1) 3-7 wt. % copolymers of propylene with one or more of ethylene and $C_4$-$C_{10}$ alpha-olefins, said copolymers having a Tm greater than 20° C. and less than 120° C., and, 2) 5-15 wt. % hydrogenated, triblock styrenic copolymers from styrene, isoprene and/or butadiene,
   wherein said wt. % amounts are based upon the total weight of the composition;
   b) extruding the product of 11 a) through a pressure release die capable of imparting an extruded profile shape.

16. The method of claim 14 wherein the dynamically vulcanized thermoplastic elastomer composition further comprises:
   iv) 3-12 wt % solid filler; and/or
   v) 35-45 wt. % of a non-aromatic hydrocarbon oil,
wherein said wt. % amounts are based upon the total weight of the composition.

17. The method of claim 11 wherein said supercritical gas is $N_2$.

18. The method of claim 11 wherein said cross-linkable hydrocarbon rubber is EPDM or halobutyl rubber.

19. The method of claim 11 wherein said hydrogenated, triblock copolymer is a styrene-ethylene-propylene-styrene (SEPS) copolymer.

20. The method of claim 11 wherein said thermoplastic resin is a combination of 0.8 MFR and 5-15 MFR polypropylene homopolymers or copolymers.

* * * * *